Patented Jan. 12, 1954

2,666,040

UNITED STATES PATENT OFFICE 2,666,040

HEAT STABILIZATION OF VINYLIDENE CHLORIDE RESINS

Chris E. Best, Franklin Township, Summit County, Ohio, assignor to The Firestone Tire & Rubber Company, Akron, Ohio, a corporation of Ohio No Drawing. Application February 20, 1953, Serial No. 338,159

4 Claims. (Cl. 260—31.8)

1

This invention relates to the stabilization, against deterioration by heat, of crystalline resinous polymers and copolymers of vinylidene chloride.

The crystalline resinous polymers and copolymers of vinylidene chloride soften only at rather elevated temperatures, on the order of 175° C., and are extremely sensitive to deterioration by heat. Accordingly, stabilizing agents must be added to the resins in order to fabricate them by melt-extrusion, molding and the like. Such stabilizing agents must provide an exceptionally complete protection against deterioration by heat, since any slight degree of decomposition of the resin during high temperature processing will render the articles made therefrom more susceptible to aging by light and atmospheric oxygen. The problem is complicated by the crystalline character of the vinylidene chloride resins, whereby the molecules of the resins prefer contact with each other rather than with diluent molecules, and tend to reject and spew the majority of conventional heat stabilizing agents. The heat stabilizing agents must of course be non-toxic, non-allergenic and, so far as possible, colorless, tasteless and odorless. Accordingly, there exists a considerable need for novel and effective heat-stabilizing agents for crystalline vinylidene chloride resins.

Accordingly, it is an object of this invention to provide a novel and highly effective heat stabilizing agent for crystalline resinous polymers and copolymers of vinylidene chloride.

Another object is to provide such an agent which will be readily and stably compatible with the vinylidene chloride resins.

A further object is to provide such a stabilizing agent which will be non-toxic, non-allergenic, colorless, tasteless and odorless.

SYNOPSIS OF THE INVENTION

The above and other objects are secured, in accordance with this invention, by the incorporation, into a crystalline resinous vinylidene chloride polymer or copolymer, of from 0.5 to 4.0%, based on the weight of such polymer or copolymer, of pentachlorophenoxy propene oxide, which compound has the formula:

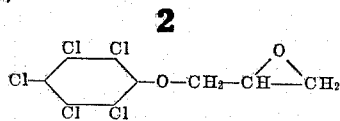

The resultant compositions are highly resistant to deterioration by heat, and may be processed at high temperatures without fear of scorching the resin, or of impairing its resistance to aging in the final products manufactured therefrom. This stabilizing action of pentachlorophenoxy propene oxide is much superior to that of any of the other chlorine-substituted phenoxy propene oxides, particularly as reflected in the age-resistance of the final resinous products. The pentachlorophenoxy propene oxide is stably compatible with the crystalline vinylidene chloride resins, and does not interfere with the compatibility or functioning of any of the other compounding ingredients ordinarily incorporated into these resins.

THE CRYSTALLINE VINYLIDENE CHLORIDE POLYMER AND COPOLYMERS

The resins forming the basis of the compositions of this invention are a well-known class of polymers of vinylidene chloride and copolymers thereof with not more than 20% of other unsaturated compounds copolymerizable therewith, and correspondingly containing at least 80% of vinylidene chloride copolymerized therein. Such resins are characterized by crystalline behavior, i. e. they fuse sharply to form relatively fluid melts which may be extruded, quenched and oriented to form strong filaments of crystalline character. A syndrome of this crystalline habit is the recalcitrance of these resins to compounding: the macromolecules of polyvinylidene chloride prefer contact with each other and tend to reject any foreign substances such as plasticizers, stabilizers and the like. It is therefore very difficult to provide suitable compounding agents for these resins, and specifically to provide mutually compatible stabilizing agents therefor.

As noted above, the base resin may be a homopolymer of vinylidene chloride, or a copolymer thereof with other unsaturated compounds, which copolymer must contain at least 80% of vinylidene chloride copolymerized therein. Suitable comonomers for this purpose include for example vinyl chloride, vinyl fluoride, vinyl acetate, styrene, acrylic and methacrylic esters such as methyl methacrylate, ethyl acrylate and the like, acrylonitrile, methacrylonitrile, vinyl-type ethers and ketones such as methyl vinyl ether, methyl vinyl ketone and related compounds such as methyl isopropenyl ketone and the like. For a more complete list of compounds known to copolymerize with vinylidene chloride see Krczil "Kurzes Handbuch der Polymerisationstechnik" vol. II "Mehrstoffpolymerization" Edwards Bros. Inc. p. 739, the items indented under "vinylidene chlorid."

OTHER COMPOUNDING INGREDIENTS

As noted above, the pentachlorophenoxy propene oxide of this invention does not interfere with the action of, nor does it cause spewing from the resin of, other compounding agents which may advantageously be incorporated with the resin. Such other ingredients (some of which are known in the prior art and others of which are discoveries of the present applicant and his associates) include plasticizing agents such as chlorinated aromatic compounds, dibenzyl ether, tricresyl phosphate, p-chlorophenyl p-chlorobenzoate, 2,2'-dihydroxybenzophenone, di-n-propyl tetrachlorophthalate and the like; and light stabilizing agents such as phenyl salicylate, para-t-butylphenylsalicylate and the like. The compositions of this invention will tolerate up to about 8% of the named plasticizing agents and up to about 4% of the named light-stabilizing agents, without excessive spew, the percentages cited being on the basis of the weight of the resin.

With the foregoing general discussion in mind, there are given herewith detailed examples of the practice of this invention. All parts given are by weight.

EXAMPLES

A. *Indoor test formulations*

| | Parts |
|---|---|
| Copolymer of 85% vinylidene chloride, 15% vinyl chloride | 10 |
| (Chlorinated) phenoxy propene oxide under test (per Table I) | 0.2 |
| Di-n-propyl tetrachlorophthalate | 0.45 |

A series of test compositions was made up in accordance with the Indoor Test Formulation, using various phenoxy propene oxides (both within and outside the scope of this invention) in the several compositions. In each case the selected compound and the other ingredients, in the proportions listed in the recipe, were slurried with acetone and dried with stirring until the mass was pulverulent. The mass then spread out to dry for 24 hours, at the end of which time the odor of acetone was no longer detectable. Tests were conducted on the compositions as follows:

*Heat stability-indoor test formulations*

Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was (1) heat with steam at 120 pounds per square inch, and mold pressure of 1000 pounds per square inch for three minutes, (2) water cooling under 1000 pounds per square inch mold pressure for two minutes, and (3) ejection from the press. The resultant cylindrical button (1.25 inches in diameter×.125—.188 inches in height) was then cut into sector-shaped specimens which were placed in a forced-draft oven at 180° C. Specimens were removed at intervals of 10, 20 and 30 minutes after placing in the oven, and the behavior of the specimens on the test as a whole rated subjectively by the operator, the composition containing the unsubstituted phenoxy propene oxide being arbitrarily chosen as the control, and the rating "Excellent" given to compositions superior to the control; "Good" to those equal to the control; "Fair" to those very slightly inferior to the control; and "Poor" to those definitely inferior to the control. The results are set forth in Table I below.

*Light stability-indoor test formulations*

A one-gram sample of the composition under test was placed between cellophane sheets and pressed in a flat platen laboratory press under a total of 1000 pounds at a temperature of 180° C., yielding a plaque approximately 6–8 mils thick. A specimen of the plaque was exposed in a Standard X-1-A Weatherometer, using a Corex D filter and operating without the sprays, and the behavior thereof under the test rated subjectively by the operator as "Excellent," "Good," "Fair" or "Poor," using the unsubstituted phenoxy propane oxide as the control, and assigning the same meanings to the several ratings as before. The results are set forth in Table I below.

*Spew-indoor test formulations*

A plaque was prepared from the composition under test as described under "Light Stability," the plaque being removed hot from the press and immediately quenched in cold water. A strip ⅜ inch wide was cut from the plaque, the cellophane removed and the strip stretched to orient it to the limit. The strip was then sandwiched between sheets of glassine paper, and the sandwich kept flat under the weight of a glass plate for 60 hours at room temperature. The degree of spew was visible on the glassine sheets, and the behavior of the composition in the test subjectively rated by the operator as "Excellent," "Good," "Fair," or "Poor," using the composition containing unsubstituted phenoxy propene oxide as the control and assigning ratings as before. The results are set out in Table I below.

B. *Outdoor test formulation*

| | Parts |
|---|---|
| Copolymer of 85% vinylidene chloride, 15% vinyl chloride | 10 |
| (Chlorinated) phenoxy propene oxide under test (per Table I) | 0.2 |
| Di-n-propyl tetrachlorophthalate | 0.45 |
| Phenyl salicylate | 0.2 |

A series of compositions was prepared in accordance with the above Outdoor Test Formulation, using various phenoxy propene oxides (both within and outside the scope of this invention) in the several compositions. In each case, the selected compound and other ingredients, in the proportions listed in the recipe, were melt extruded with a die temperature of 180° C., quenched, and oriented to yield a filament .006 inch in diameter. This filament was then exposed to Florida sunlight in accordance with Tentative Test 16–45, Colorfastness to Light, American Association of Textile Chemists and Colorists Technical Manual and Year Book, 1951 pp. 101–2. The cloth standard used for comparison with each filament, and the number of hours of exposure to sunlight required to produce equivalent color change of the filament and cloth standard, are set forth in Table I.

TABLE I

| (Chlorinated) phenoxy propene oxide used | Indoor test formulation | | | | Outdoor test formulation | | Run No. |
|---|---|---|---|---|---|---|---|
| | Stability | | Spew | Odor | Cloth standard | Sunlight hours exposure | |
| | Heat | Light | | | | | |
| Phenoxy propene oxide (control) | Good | Good | Good | Strong | L8 | 160 | 1 |
| p-Chlorophenoxy propene oxide | | Poor | | Fairly strong | | | 2 |
| 2,4-dichlorophenoxy propene oxide | Fair | do | Good | Faint | L7 | 160 | 3 |
| 2,4,6-trichlorophenoxy propene oxide | Good | Excellent | Fair | do | L7 | 160 | 4 |
| Pentachlorophenoxy propene oxide | do | do | Good | None | L8 | 320 | 5 |

From an examination of Table I, it will be seen that, as compared to unsubstituted phenoxy propene oxide and the other chloro-substituted phenoxy propene oxides, the pentachlorophenoxy propene oxide of this invention uniquely combines (I) an acceptable degree of compatability with vinylidene chloride with (II) a high degree of stabilizing action against deterioration by heat. This stabilizing action shows up particularly well in the resistance of the heat-processed resin to subsequent deterioration under weathering conditions, note the columns under "Stability" subdivision "Light" and under "Outdoor Test Formulation." The filament containing pentachlorophenoxy propene oxide withstood deterioration by sunlight for a longer time, and against a more light-fast standard (L8) than any of the other filaments. The pentachlorophenoxy propene oxide is free from the objectionable odors characterizing many of the conventional heat-stabilizing agents, and is non-toxic and non-allergenic. The compound is cheaply and readily procurable from domestic sources.

What is claimed is:

1. A heat-stabilized composition comprising a crystalline resin selected from the group consisting of polymers of vinylidene chloride and copolymers thereof with other ethylenically unsaturated compounds copolymerizable therewith, said copolymers containing at least 80% of vinylidene chloride copolymerized therein, together with from 0.5 to 4.0% of pentachlorophenoxy propene oxide homogeneously compounded therewith, said percentages being on the basis of the weight of said resin.

2. A stably compatible heat-stabilized composition comprising (A) a crystalline resin selected from the group consisting of polymers of vinylidene chloride and copolymers thereof with other ethylenically unsaturated compounds copolymerizable therewith, said copolymers containing at least 80% of vinylidene chloride copolymerized therein, and (B) from 0.5 to 4.0% of pentachlorophenoxy propene oxide homogeneously compounded therewith, said percentages being on the basis of the weight of said resin, together with a plasticizer and a light stabilizer, all of said ingredients being homogeneously compounded together.

3. A stably compatible heat-stabilized composition comprising

| | Parts |
|---|---|
| A vinylidene chloride resin | 10.0 |
| Pentachlorophenoxy propene oxide | 0.2 |
| Di-n-propyl tetrachlorophthalate | 0.45 |
| Phenyl salicylate | 0.2 | said vinylidene chloride resin being selected from the group consisting of polymers of vinylidene chloride and copolymers thereof with other ethylenically unsaturated compounds copolymerizable therewith, said copolymers containing at least 80% of vinylidene chloride copolymerized therein.

4. The process which comprises melt-extruding a crystalline resin selected from the group consisting of polymers of vinylidene chloride and copolymers thereof with other ethylenically unsaturated compounds copolymerizable therewith, said copolymers containing at least 80% of vinylidene chloride copolymerized therein, and said resin having from 0.5 to 4.0% of pentachlorophenoxy propene oxide homogeneously compounded therewith, said percentages being on the basis of the weight of said resin.

CHRIS E. BEST.

References Cited in the file of this patent
UNITED STATES PATENTS

| Number | Name | Date |
|---|---|---|
| 2,221,771 | Alquist et al. | Nov. 19, 1940 |